(12) United States Patent
Hunukumbure et al.

(10) Patent No.: US 9,402,258 B2
(45) Date of Patent: Jul. 26, 2016

(54) WIRELESS COMMUNICATION METHOD USING A FEMTO BASE STATION AND A FEMTO BASE STATION FOR USE THEREWITH

(71) Applicant: FUJITSU LIMITED, Kawasaki-shi, Kanagawa (JP)

(72) Inventors: Rajaguru Mudiyanselage Mythri Hunukumbure, Hillingdon (GB); Sunil Keshavji Vadgama, Ashford Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/721,333

(22) Filed: May 26, 2015

(65) Prior Publication Data
US 2016/0100405 A1    Apr. 7, 2016

(30) Foreign Application Priority Data
Oct. 1, 2014   (EP) .................................... 14187265

(51) Int. Cl.
| | |
|---|---|
| H04W 72/00 | (2009.01) |
| H04W 72/04 | (2009.01) |
| H04W 24/02 | (2009.01) |
| H04W 88/08 | (2009.01) |
| H04W 84/04 | (2009.01) |
| H04W 88/02 | (2009.01) |
| H04W 72/06 | (2009.01) |

(52) U.S. Cl.
CPC .......... *H04W 72/0453* (2013.01); *H04W 24/02* (2013.01); *H04W 72/06* (2013.01); *H04W 84/045* (2013.01); *H04W 88/02* (2013.01); *H04W 88/08* (2013.01)

(58) Field of Classification Search
CPC ....... H02K 16/02; H02K 7/085; H02K 1/148; H02K 7/083; H02K 16/00; H02K 5/08; H02K 5/225; H02K 1/187; H02K 1/30; H02K 7/003; H02K 3/28; H02K 1/18; H02K 1/27; H02K 21/16; H02K 21/222; D06F 17/08; D06F 37/30; D06F 37/40; D06F 23/04
USPC ........................................................ 455/452.1
See application file for complete search history.

(56) References Cited

U.S. PATENT DOCUMENTS

| | | |
|---|---|---|
| 2007/0117517 A1 | 5/2007 | Hui et al. |
| 2007/0218890 A1 | 9/2007 | Cho et al. |
| 2010/0197317 A1 * | 8/2010 | Sadek et al. ........ H04W 72/082 455/452.2 |
| 2012/0083271 A1 | 4/2012 | Tsunekawa |

FOREIGN PATENT DOCUMENTS

| | | | |
|---|---|---|---|
| EP | 2 391 156 A2 | 11/2011 | |
| EP | 2391156 A2 * | 11/2011 | ............ H04W 24/02 |
| EP | 2 410 802 A1 | 1/2012 | |
| WO | WO 2013/162492 A1 | 10/2013 | |

OTHER PUBLICATIONS

European Search Report of European Patent Application No. 14187265.5-1854 dated Mar. 23, 2015.

* cited by examiner

*Primary Examiner* — Tanmay Shah
(74) *Attorney, Agent, or Firm* — Arent Fox LLP

(57) ABSTRACT

A communication method for a wireless communication network comprises: providing a femto base station configured to communicate wirelessly with one or more wireless communication devices within the coverage area of the femto base station, wherein the femto base station may communicate on a plurality of different carrier frequencies; monitoring each communication device within the coverage area; and activating and/or deactivating one or more main carrier frequencies of the femto base station, in accordance with communication requirements of the communication devices; wherein a communication device, which is within the coverage area of the femto base station but is not being served by an active main carrier frequency of the femto base station, is served by a macro base station, having a coverage area within the coverage area of the femto base station, or, if the femto base station is also capable of communicating on auxiliary carrier frequencies, an auxiliary carrier frequency.

19 Claims, 6 Drawing Sheets

WIRELESS COMMUNICATION METHOD USING A FEMTO BASE STATION AND A FEMTO BASE STATION FOR USE THEREWITH

CROSS-REFERENCE TO RELATED APPLICATION

This application claims priority to European Patent Application No. 14187265.5, filed Oct. 1, 2014. The disclosure of the priority application is incorporated in its entirety herein by reference.

FIELD

The present invention relates to a wireless communication method using a femto base station and a femto base station for use therewith.

BACKGROUND

To deal with the exponential growth in mobile data demand, mobile (cellular) network operators are using two different approaches. One aspect is the densification of the networks, resulting in large scale deployments of small cells. The other is the utilization of more spectrum, be it in a multiple Radio Access Technology (multi-RAT) format or as carrier aggregation or wider bandwidths. The multiple RATs include 4G LTE and, importantly, wireless local area networks (WLAN, but often known as WiFi™) for the small cells. It is expected that, in the near future, there will be a very large scale deployment of dual mode (e.g. Long Term Evolution—LTE—and WiFi) supported femto base stations/femtocells (small, low-power cellular base stations) in public spaces like shopping malls, railway stations and airports. It will be cost effective for operators to collaborate and deploy multi-operator femtocells in these public spaces. There may even emerge third party entities to install and maintain these femtocells, leasing capacity to the operators.

The main problem in achieving a multi-operator, dual mode femtocell will be the number of operations carriers it has to support. In particular, the LTE spectrum is highly fragmented and with each operator having two to three LTE carriers, a default multi-operator femtocell would have to support about ten to twelve LTE carriers. This would push up the cost, size and complexity of the femtocells. Furthermore, LTE carriers are not harmonized globally and it would be difficult to support roaming users in some situations. There are many femto networks, for example in airports, hotels or department stores, where roaming users make up a significant percentage of the user population. In many cases, especially with users visiting from abroad, the fragmented LTE bands do not overlap sufficiently. From an operator perspective, supporting roaming users is critical, as this brings in significant revenues. In some cases the operators would have to deploy different femtocells to support both local users and roaming users and this would be highly ineffective in terms of cost and complexity.

It is desirable to facilitate the use of dual mode femtocells.

SUMMARY

According to an embodiment of a first aspect of the present invention there is provided a wireless communication method for use in a wireless communication network comprising: providing a femto base station in the network which is configured to communicate wirelessly with a set of one or more wireless communication devices within the coverage area of the femto base station, the femto base station being capable of communicating on a plurality of different carrier frequencies; monitoring each communication device within the coverage area; and carrying out a process of activating and/or deactivating one or more carrier frequencies of the femto base station, selected from the plurality of carrier frequencies, in accordance with communication requirements of the communication devices.

As user populations in the public areas which would be served by femto base stations are highly dynamic, rather than continuously support all possible required carrier frequencies through a static carrier activation system, a method embodying the present invention employs a dynamic carrier frequency selection which activates and/or deactivates carrier frequencies of the apparatus in accordance with communication requirements of the connected devices (e.g. operations carriers of the devices, applications running on the devices, service level agreements and/or quality of service requirements).

A method embodying the first aspect of the present invention further comprises providing in the network a macro base station having a coverage area within which the coverage area of the femto base station falls, wherein a communication device, which is within the coverage area of the femto base station but is not being served by an active main carrier frequency of the femto base station, is served by the macro base station.

An embodiment of the present invention can provide a cost effective way for a public access, multi-operator femto base station to support multiple user equipments (UEs) with differing active carriers by dynamically selecting a limited number of carriers to be active within the cell. The UEs not operating within these carriers are supported by one or more macro base stations (macrocells) of the underlay network. It is assumed (as in most practical deployments) that the macro cells would support all or most of the carriers an operator possesses. In a particular embodiment, the femto base station has the capability of continually monitoring cell performance and activating the necessary carriers, e.g. LTE carriers. The femtocell may have inter-cell links with the macro cell(s) and may obtain information about the UEs which are within its coverage area but are not served by the femtocell. As the UE population dynamically varies, the femto base station modifies the carrier selection process according to predetermined algorithms.

One such algorithm may take into consideration such factors as the distance of the UEs from the cell site and/or the signal quality, and determine on the basis of one or more of such factors whether the UEs connected to the femto cell would get a better quality of service (QoS) than the UEs connected to the macro cell of the underlay network. Another algorithm may take into consideration the service agreements which the femto operator (or service provider) has in place with each of the operators, in which case the carrier selection may be geared to serve the UEs of preferred operators. Alternatively a form of fair usage policy may be implemented if the service agreements are equal. If the activation of carriers is intended mainly for the purpose of supporting roaming users, which are far more profitable for the operators, all of the algorithms may be geared towards supporting them.

In one embodiment the femto base station is also operable to communicate using one or more auxiliary carrier frequencies, in addition to the plurality of main carrier frequencies. This negates the need for those UEs which are not supported by active main carriers of the femtocell to be connected to the macrocell, as a UE which is within the coverage area of the femto base station but is not being served by an active main carrier frequency of the femto base station may be served by one of the auxiliary carrier frequencies.

The auxiliary carrier frequencies may comprise, for example, carrier grade WiFi frequencies, 3G UMTS frequencies, 2G GSM frequencies, White-Fi frequencies and LTE-U frequencies.

Carrier grade WiFi is WiFi which is very reliable, well tested and well proven in its capabilities. Carrier grade WiFi demonstrates similar levels of security and low latency as cellular technologies and is therefore expected to become the default choice of technology for femtocells. Carrier grade WiFi would allow the operators to off-load their capacity demands seamlessly and more effectively to WLAN (i.e. WiFi) carrier frequencies ("carriers"), 2.4 GHz and 5 GHZ. However, operators would still need to activate their LTE carriers, to meet the growing capacity demands. It is expected that in future users of mobile devices would not have to select the WiFi option manually on their devices and would see virtually no difference in applications run through WiFi or LTE.

There are two recent, key developments in this area.

Passpoint™ is a seamless WiFi network authentication process launched in 2012 by the WiFi Alliance. It removes the manual WiFi network selection and login process needed for previous public access WiFi. Passpoint™ opens up many opportunities for seamless traffic off-loading and on-loading for mobile operators. Passpoint™ certified equipment (WiFi access points and mobile devices) are becoming more common in the market place.

The "Next Generation Hotspot" is an initiative by the Wireless Broadband Alliance (WBA), which builds upon the Passpoint™ certification. This can be viewed as an implementation of the Passpoint™ concept on a mobile operator's network. It will deliver public WiFi with SIM based authentication and encryption similar to cellular links. With SIM based authentication, the mobile devices of a certain operator can seamlessly log-in to local or international WiFi networks supporting the said operator. This opens the way for seamless WiFi roaming, both nationally and internationally.

Having a seamless handover between two carrier grade WiFi access points, or between carrier grade WiFi and the operations carriers of mobile devices (e.g. LTE), will remove a major barrier for mobility and inter-operability. In addition, having the same level of encryption and security will encourage operators to use carrier grade WiFi and the operations carriers interchangeably in their femtocells.

Alternatively, 3G or 2G legacy RATs like UMTS and GSM can be utilized instead of carrier grade WiFi, since it is a fair assumption that future mobile phones will support all or most of these technologies. There is significant uniformity about the frequency bands used for all these legacy technologies worldwide, so they can easily form the fall back solutions in the global roaming user scenario. The performance gap between these technologies and LTE is wider than between carrier grade WiFi and LTE. Hence carrier selection algorithms should be tailored to account for this performance gap and the service level agreements drawn up with each operator in this multi-operator femto network scenario.

Similarly, another alternative would be to utilize unlicensed or lightly licensed band technology as the fall back option. For example White-Fi is an emerging technology for the lightly licensed TV white space bands. LTE-U (LTE Unlicensed) is an emerging technology for the unlicensed bands. As these are emerging technologies, the actual performance with respect to LTE is not clear at present. However it is reasonable to assume there will be some performance gap from LTE, and that the band selection algorithms and the service agreements with the operators will need to cater for these likely gaps.

A method embodying the first aspect of the present invention may comprise initiating connection between the femto base station and a wireless communication device using an auxiliary carrier frequency of the femto base station if no other appropriate carrier frequency of the base station is available for use by the device. In particular, an auxiliary carrier frequency, for example carrier grade WiFi, may provide the basis for all UEs in the region covered by the femtocell to initiate connections with the femtocell.

The process of activating a main carrier frequency may be carried out in response to (i) a device joining the set, and/or (ii) load on an active carrier frequency of the femto base station exceeding a first preset load level.

A method embodying the first aspect of the present invention may comprise, prior to carrying out the process, ascertaining the operations carrier or carriers of at least one wireless communication device within the coverage area of the femto base station.

The process may comprise deciding whether to activate a main carrier frequency of the femto base station which, on the basis of the ascertained operations carrier or carriers, could be used by the communication device, and, if so, activating that main carrier frequency for use by that device.

The main carrier frequency selection may be done on criteria set by one or several optimisation algorithms. The proposed algorithms may analyse the UE capabilities and activate only the few main carrier frequencies necessary to support the UEs. In particular, deciding whether to activate a main carrier frequency of the apparatus may be carried out on the basis of a carrier selection algorithm arranged so as to (i) mitigate intercell interference by selecting carriers for activation for use by devices at the edge of the cell served by the femto base station which do not overlap with those of neighbouring cells; (ii) prioritise for activation carriers which can be used by devices having, or predicted to have, the highest usage demand; (iii) prioritise for activation carriers which can be used by devices for which the highest levels of service are applicable; and/or (iv) prioritise for activation carriers which can be used by devices running applications for which main carrier frequencies are preferable.

According to a method embodying the first aspect of the present invention the process of deactivating a main carrier frequency may be carried out in response to (i) a device leaving the set, and/or (ii) load on an active main carrier frequency of the femto base station being below a second preset load level. The process may comprise deciding whether there is an active main carrier frequency which is not being, and/or cannot be, used by any of the devices, and, if so, deactivating that main carrier frequency.

According to an embodiment of a second aspect of the present invention there is provided a femto base station for use in a wireless communication network which is configured to communicate wirelessly with a set of one or more wireless communication devices within the coverage area of the femto base station, wherein the femto base station is capable of communicating on a plurality of different main carrier frequencies, which apparatus comprises: monitoring means configured to monitor each communication device within the coverage area; and control means operable to carry out a process of activating and/or deactivating one or more main carrier frequencies of the femto base station, selected from the plurality of main carrier frequencies, in accordance with communication requirements of the connected devices; wherein the base station is also capable of communicating using one or more auxiliary carrier frequencies, in addition to the plurality of main carrier frequencies, and is operable to serve a communication device, which is within the coverage area of the base station but is not being served by an active main carrier frequency of the base station, using one of the auxiliary carrier frequencies. The one or more auxiliary carrier frequencies may comprise: carrier grade WiFi frequencies; 3G UMTS frequencies; 2G GSM frequencies; White-Fi frequencies; and/or LTE-U frequencies.

A base station embodying the second aspect of the present invention may be configured to initiate connection between the base station and a wireless communication device using an auxiliary carrier frequency of the base station if no other appropriate main carrier frequency of the base station is available for use by the device. In particular an auxiliary carrier frequency, for example carrier grade WiFi, may provide the basis for all UEs in the region covered by the femtocell to initiate connections with the femtocell.

A base station embodying the second aspect of the present invention may be configured to carry out the process of activating a main carrier frequency in response to (i) a device joining the set, and/or (ii) load on an active carrier frequency of the base station exceeding a first preset load level.

A base station embodying the second aspect of the present invention may further comprise operations carriers obtaining means operable to ascertain the operations carrier or carriers of at least one communication device within the coverage area of the base station and supply this information to the control means.

In such a base station the control means may comprise activation decision means for deciding whether to activate a main carrier frequency of the base station which, on the basis of the ascertained operations carrier or carriers, could be used by the device, and carrier frequency activation means for activating that main carrier frequency for use by that device in response to a positive result by the activation decision means. The control means may be further operable to cause the device to be connected via the newly-activated main carrier frequency.

The main carrier frequency selection may be done on criteria set by one or several optimisation algorithms. The proposed algorithms may analyse the UE capabilities and activate only the few main carrier frequencies necessary to support the UEs. In particular, the activation decision means may be operable to decide whether to activate a main carrier frequency of the base station on the basis of a carrier selection algorithm arranged so as to (i) mitigate intercell interference by selecting carriers for activation for use by devices at the edge of the cell served by the base station which do not overlap with those of neighbouring cells; (ii) prioritise for activation carriers which can be used by devices having, or predicted to have, the highest usage demand; (iii) prioritise for activation carriers which can be used by devices for which the highest levels of service are applicable; and/or (iv) prioritise for activation carriers which can be used by devices running applications for which main carrier frequencies are preferable.

A base station embodying the second aspect of the present invention may be configured to carry out the process of deactivating a main carrier frequency in response to the monitoring means detecting that (i) a device has left the set, and/or (ii) load on an active main carrier frequency of the base station is below a second preset load level. The control means may comprise deactivation decision means for deciding whether there is an active main carrier frequency which is not being, and/or cannot be, used by any of the connected devices, and carrier frequency deactivation means for deactivating that main carrier frequency in response to a positive result by the deactivation decision means.

According to an embodiment of a third aspect of the present invention there is provided a wireless communication system comprising a femto base station embodying the second aspect of the present invention and at least one wireless communication device with which the apparatus is configured to communicate.

A system embodying the fourth aspect of the present invention may further comprise a macro base station having a coverage area within which the coverage area of the femto base station falls, the macro base station being configured to serve a communication device which is within the coverage area of the femto base station but is not being served by an active main carrier frequency of the femto base station.

According to an embodiment of a fourth aspect of the present invention there is provided a computer program which, when run on a computer, causes that computer to carry out a method embodying the first aspect of the present invention, or to become a base station embodying the second aspect of the present invention.

BRIEF DESCRIPTION OF THE DRAWINGS

Reference will now be made, by way of example, to the accompanying drawings, in which.

DETAILED DESCRIPTION

Embodiments of the present invention will now be described with reference to FIGS. 1A and 1B, in which a femtocell (femto eNB) 1 communicates with UEs (user equipment) MS1 to MSn within its coverage area A using main (LTE) carriers. The LTE carriers are activated based on demand from the active user population. Similarly, unused or under-used LTE carriers may be deactivated.

Figure 1A:
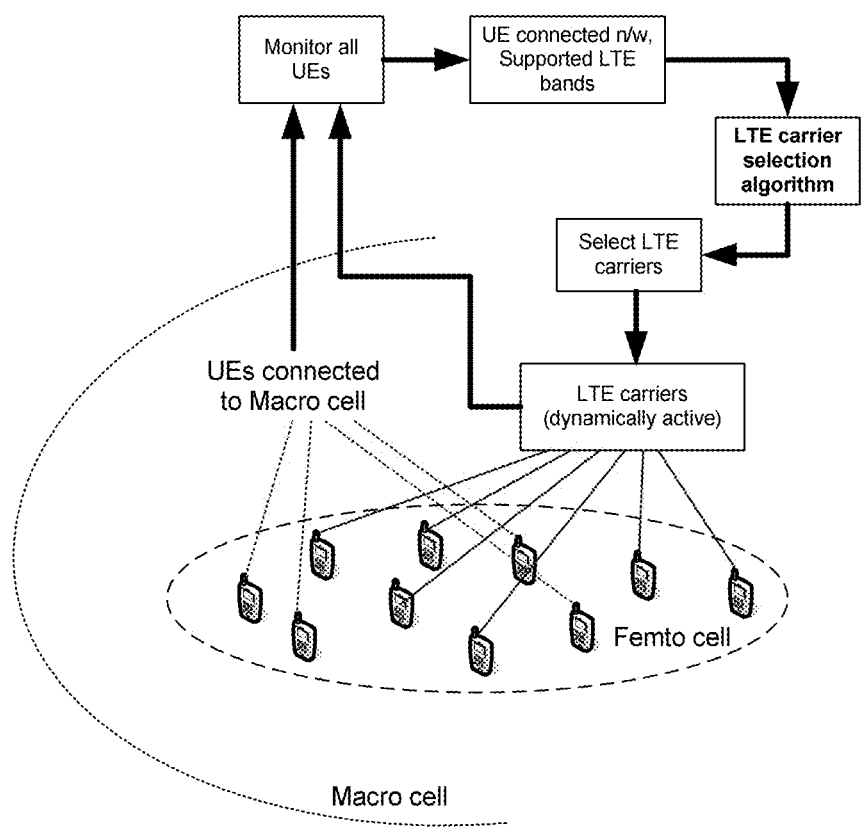
FIGS. 1A and 1B are diagrams for use in explaining LTE carrier selection in a public access femto eNB embodying the present invention.

In the embodiment of FIG. 1A, if a UE entering (or turning on in) the coverage area A finds that its LTE operations carrier matches one of the femtocell's LTE carriers which is already active, it will connect to that carrier. The UEs MS1 to MSn within coverage area A which are not operating within the active carriers of the femtocell 1 are supported by a macrocell 100 of the underlay network.

Figure 1B:
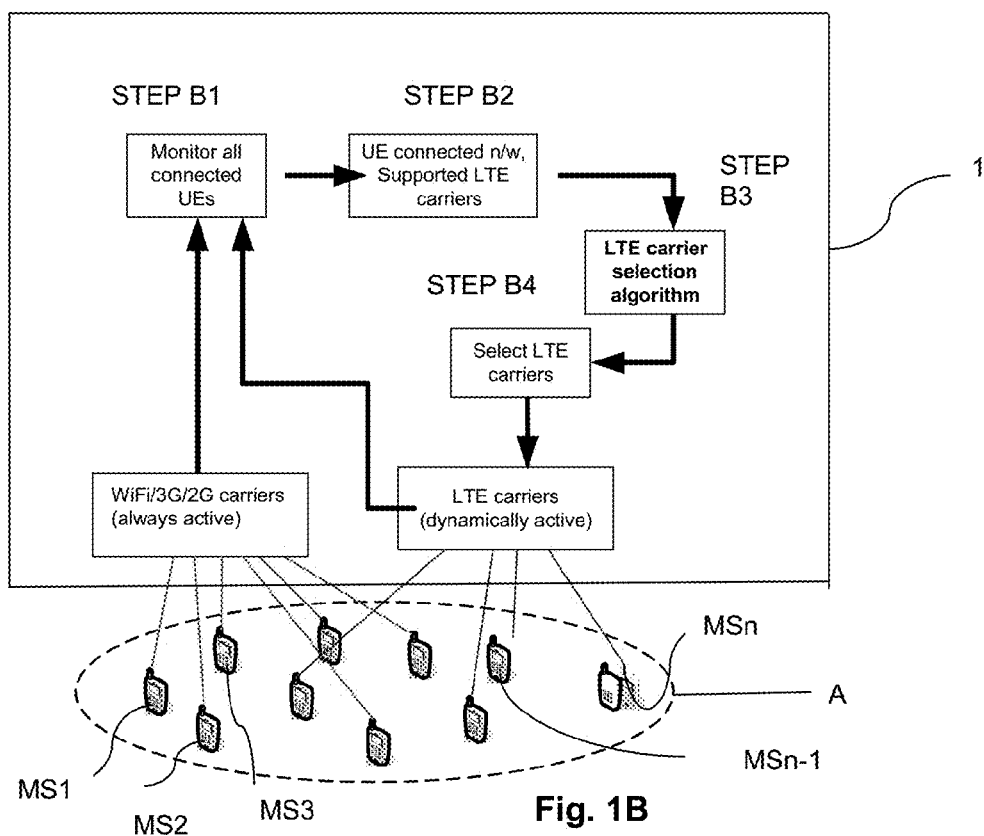

In the alternative embodiment of FIG. 1B, at any given point in time, the femtocell 1 provides at least one auxiliary carrier (for example carrier grade WiFi, 3G, 2G) and main (LTE) carriers for use by UEs MS1 to MSn within its coverage area A. The auxiliary carrier frequency is always on, providing connectivity to users belonging to multiple networks. In this embodiment the number of active LTE carriers in the femtocell 1 is controlled by collecting information about the active users through SIM based authentication using the auxiliary carrier (e.g. carrier grade WiFi, 3G, 2G). The auxiliary carrier (e.g. carrier grade WiFi, 3G, 2G) can be used as the basis for connection for all UEs and to learn information about the UEs, so appropriate LTE carriers can be activated. Depending upon the demand from the UEs MS1 to MSn, the femtocell 1 can activate one or more main LTE carriers, from a selected set of LTE carriers, for use by the UEs (user equipment) MS1 to MSn. If a UE entering (or turning on in) the coverage area A finds that its LTE operations carrier matches one of the femtocell's LTE carriers which is already active, it will connect to that carrier. If not, the UE will connect to an auxiliary carrier of the femtocell 1 by default.

The femtocell 1 of FIG. 1A or 1B monitors all the connected UEs MS1 to MSn (STEP A1/STEP B1) and uses SIM based authentication to collect information about the UEs (STEP A2/STEP B2). The SIM authentication information is generally transparent at the femtocell level and visible only to the higher layers of the network, so the femtocell 1 requests this information from the network. The femtocell 1 receives data concerning the applications and capable LTE carrier sets of the connected UE population and analyses this data against a specified LTE carrier selection algorithm (STEP A3/STEP B3) to determine whether to activate or deactivate any of the LTE carriers, as discussed later. If this analysis yields that an LTE carrier that can be provided by the femtocell 1 matches an operations carrier of a UE and should be activated, the femtocell 1 will first activate the related carrier and then execute the handover process for the UE concerned (STEP A4/STEP B4). Similarly, if the analysis indicates that an active LTE carrier of the femtocell 1 is no longer required by any of the currently-connected UEs, the femtocell 1 deactivates the LTE carrier concerned. Thus the multi-carrier femtocell 1 can be regarded as operating as a multi-cell femto eNB, where activation and de-activation of LTE cells are regularly carried out.

Figure 2:
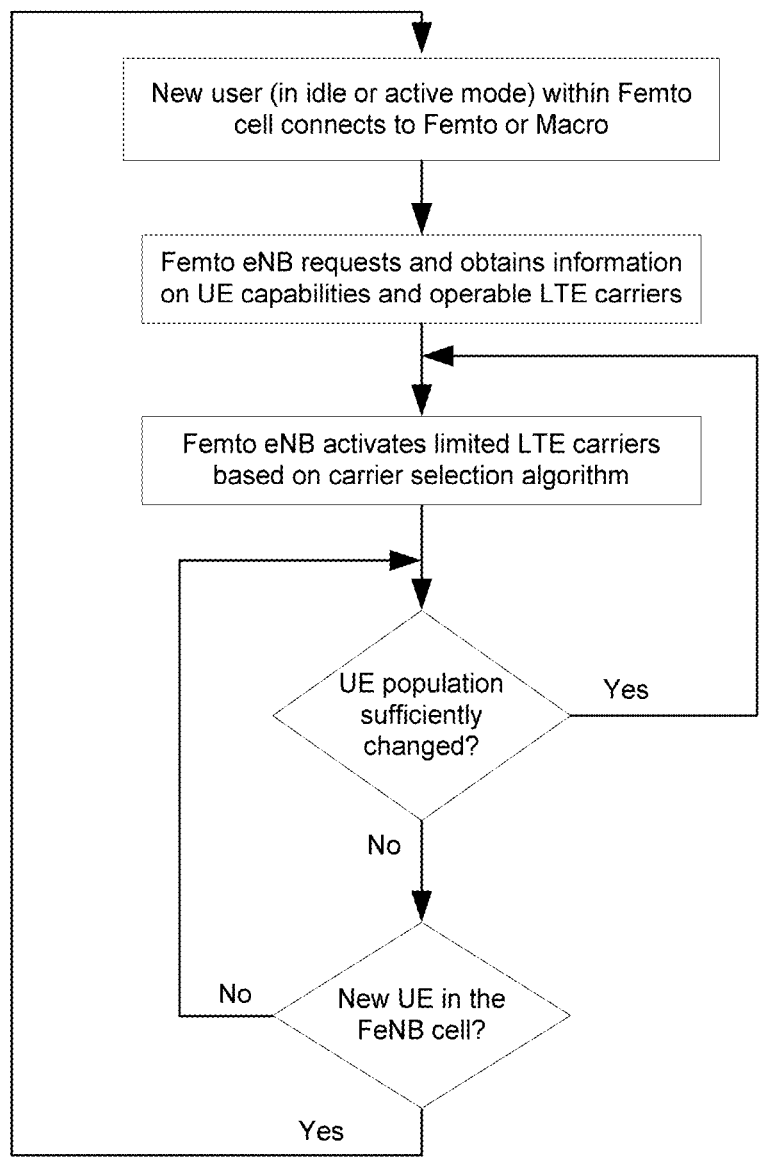
FIG. 2 is a flow chart for the execution of main carrier frequency selection in the femto eNB of FIG. 1A using a method embodying the present invention.

A flow chart for the execution of main carrier frequency selection in the femto eNB of FIG. 1A will now be described with reference to FIG. 2. Main carrier frequency selection in the femto eNB of FIG. 1B will now be described later with reference to FIG. 5.

As mentioned above with reference to FIG. 1A, in STEP 21 a new user (UE) within coverage area A of the femtocell 1 connects, in idle or active mode, to an LTE carrier of the femtocell (femto eNB) 1, if available, or to the macrocell 100 of the underlay network if not. In STEP 22, the femtocell 1 requests and obtains information on the capabilities and operable LTE carriers of the UE from the network. On the basis of this data and a predetermined carrier selection algorithm (discussed in more detail later), the femtocell 1 decides whether to activate an LTE carrier for the new UE and if necessary activates the selected LTE carrier (STEP 23).

The femtocell 1 then considers whether the UE population has changed sufficiently to warrant considering the activation of one or more further LTE carriers (STEP 24) and, if so, repeats STEP 23.

In STEP 25 the femtocell 1 checks whether there is a new UE in its coverage area. If so, the steps of the method are repeated from STEP 21. If not, the steps of the method are repeated from STEP 24.

Figure 3:
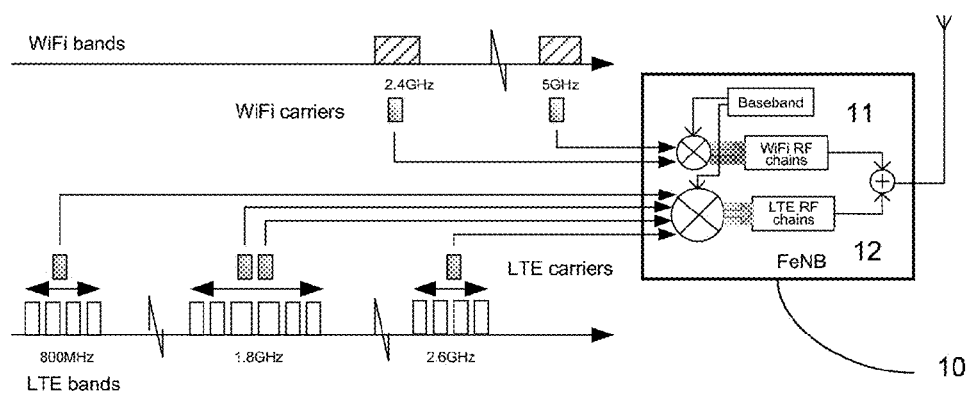
FIG. 3 is a diagram for use in explaining LTE carrier selection options using those used in the United Kingdom as an example.

In a practical implementation of the present invention, using carrier grade WiFi as the auxiliary carriers and LTE as the main carriers, as shown in FIG. 3, in a femto eNB 10 the WiFi carriers will always be supported by fixed RF chains 11 and a few LTE carriers will be supported by configurable RF chains 12. The level of RF carrier configurability depends on the cost and complexity of the RF circuitry. In the pure SDR (Software Defined Radio) sense, the LTE carriers can be configured in any part of the spectrum. This option allows full flexibility in LTE carrier selection at the expense of high cost and complexity. In a more low cost and low complexity option, the operable LTE carriers can be selected from a pre-configured set of carrierss. The pre-configuration needs careful assessment of the likelihood of usage of existing LTE carriers. In the diagram of FIG. 3, the latter option is demonstrated for LTE carrier selection using LTE carrier availability in the United Kingdom, in the 800 MHz, 1.8 GHz and 2.6 GHz spectrum bands. Considering the general user distribution and roaming user device capabilities, the allocation of two carriers in the 1.8 GHz band, and one carrier in each of the 800 Mz and 2.6 GHz bands, may be the most effective. The carriers can be switched between the exact operator carriers in these spectrum bands. Thus, in this embodiment, only four LTE carriers will be active at a given time, needing only four RF chains. This compares well against the need for nine LTE carriers and RF chains in a static carrier allocation situation.

Figure 4:
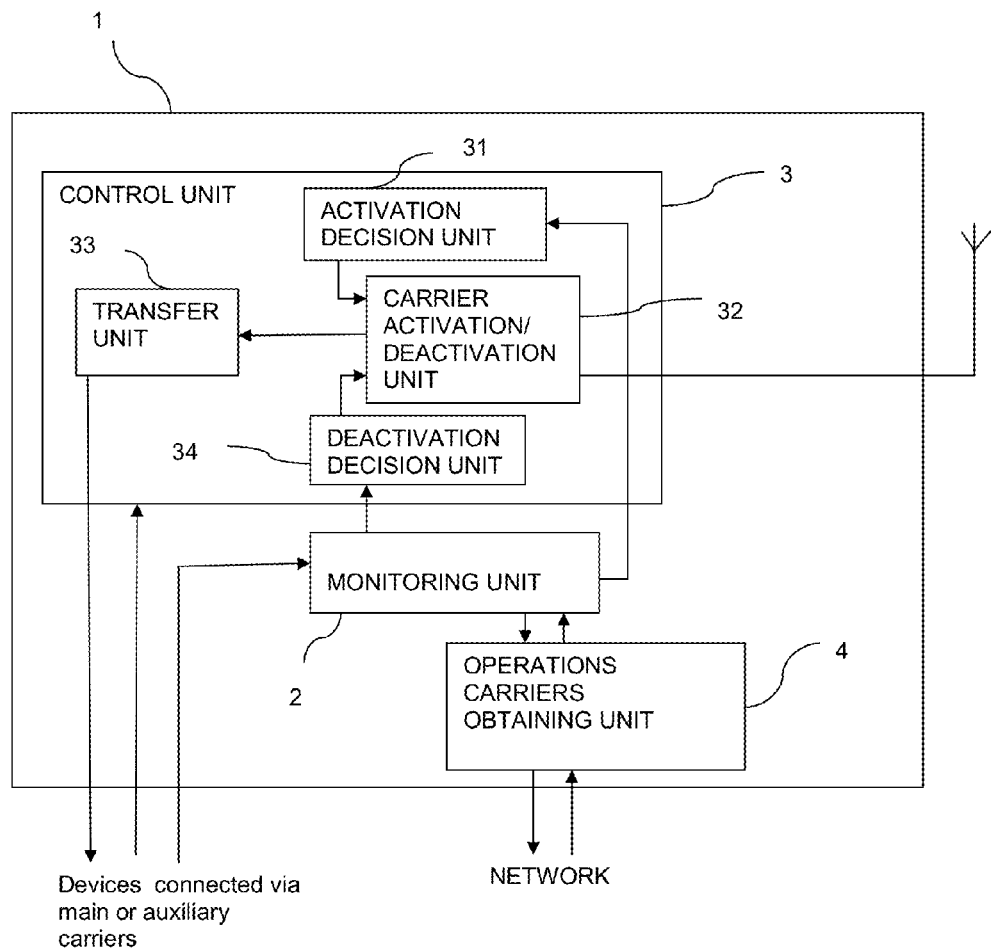
FIG. 4 is a diagram illustrating apparatus embodying the present invention.

A femtocell 1 embodying the present invention will now be described in more detail with reference to FIG. 4. Femtocell 1 is configured to communicate with a set of UEs (wireless communication devices) on a plurality of different carrier frequencies comprising one or more auxiliary carriers (for example, carrier grade WiFi, 3G UMTS, 2G GSM, White-Fi frequencies, LTE-U frequencies) and one or main carriers (for example LTE). The femtocell 1 comprises a monitoring unit (monitoring means) 2 configured to monitor the set of UEs connected to the femtocell 1. The femtocell 1 also comprises a control unit (control means) 3 operable to carry out a process of activating and/or deactivating one or more LTE carriers of the femtocell 1, selected from the plurality of carrier frequencies, in accordance with communication requirements of the connected UEs. The femtocell 1 is configured to initiate connection with the UEs using one of its auxiliary carriers if it does not have an appropriate main carrier available.

The femtocell 1 is configured to carry out the process of activating one or more of its main (LTE) carriers in response to the monitoring unit 2 detecting that (i) a UE has joined the set, and/or (ii) load on an active main or auxiliary carrier of the femtocell 1 exceeds a first preset load level.

The femtocell 1 comprises an operations carriers obtaining unit (operations carriers obtaining means) 4 operable to ascertain the operations carriers of the UEs connected to the femtocell 1 via its auxiliary (WiFi) carriers and supply this information to the control means. Information on the operations carriers of the UEs connected to the femtocell 1 via its main (LTE) carriers is supplied to the femtocell 1 automatically.

The control unit 3 comprises an activation decision unit (activation decision means) 31 for deciding whether to activate one of the femtocell's main (LTE) carriers which, on the basis of the ascertained operations carriers, could be used by a connected UE. The control unit 3 further comprises a carrier activation/deactivation unit (carrier activation means) 32 for activating that main carrier frequency for use by that UE in response to a positive result by the activation decision unit 32. A transfer unit 33 of the control unit 3 is operable to cause the connected UE to be transferred to the newly-activated main (LTE) carrier.

The activation decision unit 31 is operable to decide whether to activate one of the femtocell's main (LTE) carriers on the basis of a carrier selection algorithm. For example the algorithm may be arranged so as to (i) mitigate intercell interference by selecting carriers for activation for use by devices at the edge of the cell served by the apparatus which do not overlap with those of neighbouring cells; (ii) prioritise for activation carriers which can be used by devices having, or predicted to have, the highest usage demand; (iii) prioritise for activation carriers which can be used by devices for which the highest levels of service are applicable; and/or (iv) prioritise for activation carriers which can be used by devices running applications for which main carriers are preferable.

The femtocell 1 is also configured to carry out the process of deactivating an LTE carrier in response to the monitoring means 2 detecting that (i) a UE has left the set, and/or (ii) load on an active main (LTE) carrier of the apparatus is below a second preset load level. The control unit 3 comprises a deactivation decision unit (deactivation decision means) 34 for deciding whether there is an active main (LTE) carrier which is not being, and/or cannot be, used by any of the connected UEs. The carrier activation/deactivation unit (carrier frequency deactivation means) 32 is operable to deactivate that main carrier in response to a positive result by the deactivation decision unit 34.

Figure 5:
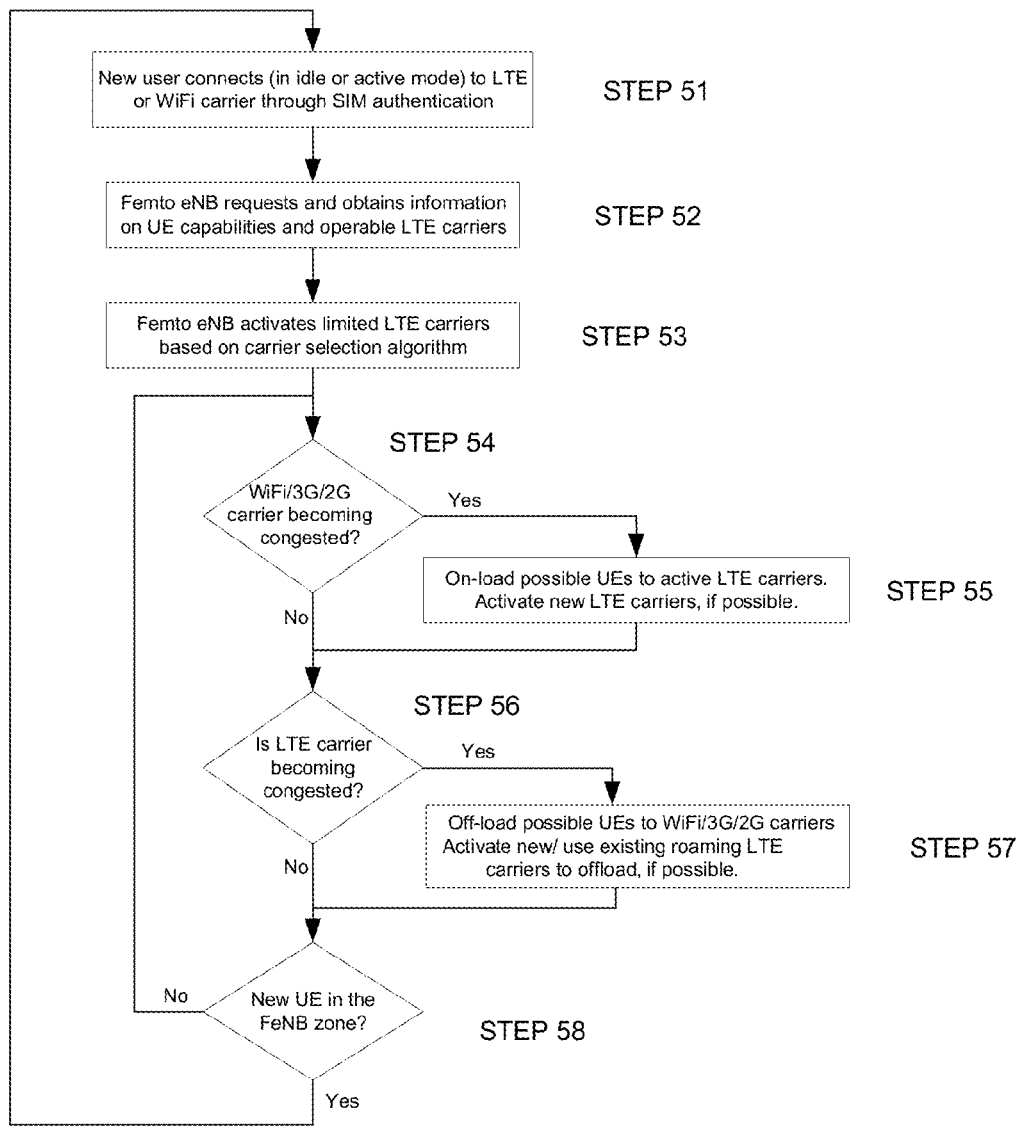
FIG. 5 is a flow chart for use in explaining the selection of an LTE carrier in the femto eNB of FIG. 1B using a method embodying the present invention.

A method embodying the present invention will now be described in more detail with reference to FIG. 5.

As mentioned above with reference to FIG. 1B, in STEP 51 a new user (UE) connects, in idle or active mode, to an LTE carrier of the femtocell (femto eNB) 1, if available, or an auxiliary (e.g. WiFi, 3G, 2G) carrier of the femtocell 1 if not, through SIM authentication. In STEP 52, if the UE connected via an auxiliary carrier, the femtocell 1 requests and obtains information on the capabilities and operable LTE carriers of the UE from the network. If the UE connected to the femtocell 1 via an LTE carrier, the femtocell 1 will automatically receive this information from the UE. In either case, on the basis of this data and a predetermined carrier selection algorithm (discussed in more detail later), the femtocell 1 decides whether to activate a LTE carrier for the new UE and if necessary activates the selected LTE carrier (STEP 53).

The femtocell 1 then considers whether an auxiliary (e.g. WiFi, 3G, 2G) carrier is becoming congested (STEP 54) and, if so, and where possible, the femtocell 1 transfers one or more UEs to one or more LTE carriers which are already active and/or to a newly-activated LTE carrier (STEP 55). Similarly (in STEP 56 and STEP 57), the femtocell 1 also considers whether an LTE carrier is becoming congested and, if so, the femtocell 1 transfers one or more UEs to an auxiliary (e.g. WiFi, 3G, 2G) carrier and/or to an existing LTE carrier or a newly-activated roaming LTE carrier.

In STEP 58 the femtocell 1 checks whether there is a new UE in its coverage area. If so, the steps of the method are repeated from STEP 51. If not, the steps of the method are repeated from STEP 54.

The carrier selection algorithms can be formulated to suit the needs of the operators or third party network managers. Some examples are given below, but this is not an exhaustive list, and different algorithms can be formulated to suit each deployment.

If all the operators are to be given the same level of service, the algorithm can focus on the current demand on its resources from UEs belonging to different operators. The algorithm can select the LTE carriers for UEs with highest demand and activate them. This increases the carrier usage for the selected LTE carriers as well as freeing up sufficient capacity in the WiFi or other auxiliary carriers to support other UEs. The current usage patterns are preferably the main guidance in carrier selection, but historical usage patterns can also be used as a guide to forecast the usage in the next time interval(s). This factor becomes more useful if regular carrier switching involves a lot of overhead for the femtocell, in handing over the UEs between each of the carriers, and if it incurs some loss of quality of service (QoS) for the end users.

Another possibility may be that certain operators have higher level of service agreements than the others. Then the algorithm can be skewed to give priority to users of these operators, by selecting their LTE carriers first. In the embodiments described above, the premise is that carrier grade WiFi or another auxiliary carrier will offer similar performance to LTE and the users would see no difference in any of the applications. If in practice it turns out that carrier grade WiFi (or other auxiliary carrier) is slightly inferior for some applications than LTE, then a priority-based carrier selection algorithm has more significance.

In the case of carrier grade WiFi or other auxiliary carrier being slightly inferior for some applications than LTE, then an algorithm can be devised where users with applications which could be affected by this inferiority are preferentially served by the LTE carriers. So rather than selecting UEs based on their operators to be included in LTE carriers, the user applications can be studied to select the UEs and relevant LTE carriers.

In the near future, there will be more collaboration between operators and network sharing (in different forms) is likely to become a common feature. In some cases these collaborations may extend to carrier sharing, for example in the form of national roaming agreements. In national roaming, a single operator can deploy and operate a network of femtocells, where the other operators lease capacity from this operator. It may become possible even to use the spectrum of all the operators involved interchangeably. This becomes particularly important where newly released frequency band sets for LTE would be only usable by new UEs, and older "legacy" UEs may not have the capability of using the new bands. Hence carrier band selection, when driven by capabilities of the terminal population, could maximise the utilisation and efficiency of system resources, QoS and user quality of experience (QoE).

Where it is possible to support other operators' UEs in LTE carriers, the carrier selection could be done in the manner of controlling cell edge interference. By selecting alternate LTE carriers for each of the adjacent femtocells, inter-cell interference could be effectively controlled. The main beneficiaries of this solution would be the cell edge LTE users. In such a carrier selection algorithm, the neighbour femtocells would sense the usage of LTE carriers in the other cells and avoid using these carriers. Some form of priority may be assigned to each femtocell to make the carrier selection simple. Alternatively, a centralized algorithm could be implemented, where the LTE carrier usage information is directed from a central processor (which may, for example, be located in a master femtocell).

Although embodiments of the invention have been described above with reference to femtocells using carrier grade WiFI in an LTE wireless communication scheme, the present invention may be applied to other types of femtocell and/or wireless communication scheme.

The above-described embodiments of the present invention may advantageously be used independently of any other of the embodiments or in any feasible combination with one or more others of the embodiments.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

The invention claimed is:

1. A femto base station for use in a wireless communication network which is configured to communicate wirelessly with a set of one or more wireless communication devices within a coverage area of the femto base station, wherein the femto base station is adapted to communicate on a plurality of different main carrier frequencies and on one or more auxiliary carrier frequencies, which the femto base station comprises:
monitoring means configured to monitor each communication device within the coverage area; and
control means operable to carry out a process of activating and/or deactivating one or more main carrier frequencies of the femto base station, selected from the plurality of main carrier frequencies, in accordance with communication requirements of connected devices;
wherein the femto base station is operable to initiate a connection with a wireless communication device within the coverage area of the femto base station using one of the auxiliary carrier frequencies of the femto base station when no other appropriate carrier frequency of the femto base station is available for use by the connected devices, and subsequently to serve a communication device, which is not being served by an active main carrier frequency of the base station, using one of the auxiliary carrier frequencies.

2. The femto base station according to claim 1, wherein the one or more auxiliary carrier frequencies comprise: carrier grade WiFi frequencies, Third Generation (3G) Universal Mobile Telecommunications System (UMTS) frequencies, Second Generation (2G) Global System for Mobile Communications (GSM) frequencies, White-Fi frequencies, and/or Long Term Evolution (LTE) in unlicensed spectrum (LTE-U) frequencies.

3. The femto base station according to claim 1, wherein the femto base station is configured to carry out the process of activating a main carrier frequency in response to (i) a device joining the set, and/or (ii) load on an active carrier frequency of the femto base station exceeding a first preset load level.

4. The femto base station according to claim 1, wherein the femto base station is operable, prior to carrying out the process, to ascertain the operations carrier or carriers of at least one wireless communication device within the coverage area of the femto base station.

5. The femto base station according to claim 4, wherein the process comprises deciding whether to activate a main carrier frequency of the femto base station which, based on the ascertained operations carrier or carriers, could be used by the at least one wireless communication device, and, if so, activating that main carrier frequency for use by the at least one wireless communication device.

6. The femto base station according to claim 5, wherein the process further comprises connecting the at least one wireless communication device via the newly-activated main carrier frequency.

7. The femto base station according to claim 5, configured to decide whether to activate a main carrier frequency of the femto base station based on a carrier selection algorithm arranged so as to: (i) mitigate intercell interference by selecting carriers for activation for use by devices at an edge of a cell served by the femto base station which do not overlap with those of neighbouring cells; (ii) prioritize for activation carriers which can be used by devices having, or predicted to have, a highest usage demand; (iii) prioritize for the activation carriers which can be used by the devices for which highest levels of service are applicable; and/or (iv) prioritize for the activation carriers which can be used by the devices running applications for which main carrier frequencies are preferable.

8. The femto base station according to claim 1, wherein the femto base station is configured to carry out the process of deactivating a main carrier frequency in response to (i) a device leaving the set, and/or (ii) load on an active main carrier frequency of the femto base station being below a second preset load level.

9. The femto base station according to claim 8, wherein the process comprises deciding whether there is an active main carrier frequency which is not being, and/or cannot be, used by any of the devices, and, if so, deactivating that main carrier frequency.

10. A wireless communication system comprising: a femto base station according to claim 1 and at least one wireless communication device with which the base station is configured to communicate.

11. A wireless communication method for use in a wireless communication network, the wireless communication method comprising:
providing in the wireless communication network a femto base station, which is configured to communicate wirelessly with a set of one or more wireless communication devices within a coverage area of the femto base station, wherein the femto base station is adapted to communicate on a plurality of different main carrier frequencies and on one or more auxiliary carrier frequencies;
monitoring each communication device within the coverage area; and
carrying out a process of activating and/or deactivating one or more main carrier frequencies of the femto base station, selected from the plurality of different main carrier frequencies, in accordance with communication requirements of the communication devices; and
initiating a connection between the femto base station and a wireless communication device using one of the auxiliary carrier frequencies of the femto base station when no other appropriate carrier frequency of the femto base station is available for use by the wireless communication device,
wherein subsequently a wireless communication device, which is within the coverage area of the femto base station but is not being served by an active main carrier frequency of the femto base station, is served by an auxiliary carrier frequency of the femto base station.

12. The wireless communication method according to claim 11, wherein the one or more auxiliary carrier frequencies comprise: carrier grade WiFi frequencies, Third Generation (3G) Universal Mobile Telecommunication System (UMTS) frequencies, Second Generation (2G) Global System for Mobile Communication (GSM) frequencies, White-Fi frequencies, and/or Long Te Evolution (LTE) in unlicensed spectrum (LTE-U) frequencies.

13. The wireless communication method according to claim 11, wherein the process of activating a main carrier frequency is carried out in response to (i) a device joining the set, and/or (ii) load on an active carrier frequency of the femto base station exceeding a first preset load level.

14. The wireless communication method according to claim 11, further comprising, prior to carrying out the process, ascertaining the operations carrier or carriers of at least one wireless communication device within the coverage area of the femto base station.

15. The wireless communication method according to claim 14, wherein the process comprises deciding whether to activate a main carrier frequency of the femto base station which, based on the ascertained operations carrier or carriers, could be used by the at least one wireless communication device, and, if so, activating that main carrier frequency for use by the at least one wireless communication device.

16. The wireless communication method according to claim 15, wherein the process further comprises connecting the at least one wireless communication device via the newly-activated main carrier frequency.

17. The wireless communication method according to claim 15, wherein deciding whether to activate a main carrier frequency of the femto base station is carried out based on a carrier selection algorithm arranged so as to: (i) mitigate intercell interference by selecting carriers for activation for use by devices at an edge of a cell served by the femto base station which do not overlap with those of neighbouring cells; (ii) prioritize for activation carriers which can be used by devices having, or predicted to have, a highest usage demand; (iii) prioritize for activation carriers which can be used by the devices for which highest levels of service are applicable; and/or (iv) prioritize for activation carriers which can be used by devices running applications for which main carrier frequencies are preferable.

18. The wireless communication method according to claim 11, wherein the process of deactivating a main carrier frequency is carried out in response to (i) a device leaving the set, and/or (ii) load on an active main carrier frequency of the femto base station being below a second preset load level.

19. The wireless communication method according to claim 18, wherein the process comprises deciding whether there is an active main carrier frequency which is not being, and/or cannot be, used by any of the devices, and, if so, deactivating the main carrier frequency.

* * * * *